United States Patent [19]
Jaquith, deceased et al.

[11] 4,367,830
[45] Jan. 11, 1983

[54] MUSICAL INSTRUMENT SUPPORT

[75] Inventors: Douglas Jaquith, deceased, late of Yakima, Wash.; by Hope Jaquith, heiress, 13732 Hillhurst Dr. #24, Laguna Niguel, Calif. 92677; by Kent Jaquith, heir, Zillah, Wash.; by William Jaquith, heir, Laguna Niguel, Calif.

[73] Assignee: Hope Jaquith, Laguna Niguel, Calif.

[21] Appl. No.: 283,165

[22] Filed: Jul. 14, 1981

[51] Int. Cl.³ .................. A44B 17/00; C10D 3/00
[52] U.S. Cl. .................... 224/258; 224/910; 294/83 R; 24/230 AT; 24/232 R
[58] Field of Search .......... 224/258, 910; 294/83 R; 84/327, 453; 24/129 R, 230 A, 230 AS, 230 AT, 232 R, 251 P

[56] References Cited

U.S. PATENT DOCUMENTS

| | | | |
|---|---|---|---|
| 1,891,947 | 12/1932 | Powell | 224/910 X |
| 2,615,324 | 10/1952 | Meeker | 24/232 X |
| 3,031,222 | 4/1962 | Stewart | 294/83 R X |
| 3,057,526 | 10/1962 | Jaquith | 24/232 X |
| 3,930,289 | 1/1976 | Singular | 24/230 AT |

Primary Examiner—Steven M. Pollard
Attorney, Agent, or Firm—Blakely, Sokoloff, Taylor & Zafman

[57] ABSTRACT

A musical instrument support, having an improved slide for adjusting the length of the support and an improved clasp for engaging a musical instrument to be supported is disclosed. The slide is approximately circular in shape and is constructed in a manner to reduce the wearing of a cord which passes through the slide. This is accomplished by utilizing a sleeve which has a lower coefficient of friction than the material from which the slide is made. The cord forms two annular loops around the sleeve. The friction between the annular loops and the sleeve is sufficient to maintain the support at a given length. The clasp is constructed in a manner which reduces the number of moving parts needed to engage and disengage the musical instrument over the prior art thereby simplifying the manufacturing process. In particular, means are provided for disengaging the musical instrument from the clasp, which means comprises only a spring, two retractable jaws and a plunger having an end of predetermined extent which a support ring on the instrument may bear against, thereby compressing the spring and retracting the jaws.

3 Claims, 3 Drawing Figures

MUSICAL INSTRUMENT SUPPORT

PRIOR ART

Musical instrument supports are frequently utilized by musicians to enable their hands and arms to be free to play a musical instrument without having to support the weight of the instrument. One type of musical instrument support frequently used for saxaphones, clarinets and the like is comprised of a neck engaging portion worn around the neck of a musician, means for coupling the support to an instrument and means for adjusting the length of the support to conform to the instrument coupled thereto and the size of the musician.

For example, in U.S. Pat. No. 3,057,526 which issued Oct. 9, 1962, such a prior art musical instrument support is described. The instrument support disclosed therein is comprised of a wide neck band portion, a cord, a slide member and a clasp member. The clasp is disposed at an end of the support opposite the wide neck band portion and the slide is disposed intermediate the ends of the support. The cord passes through an annular loop portion in the slide, exits the slide and continues to the clasp. A loop is formed within the clasp whereupon the cord continues back to the slide. A second loop is then formed within the slide and the cord again passes through the clasp whereupon a third loop is formed within the clasp. The cord then exits the clasp and reenters the slide whereupon a second annular loop is formed adjacent the first annular loop. The two annular loops within the slide prevent the slide from moving until a force is applied which is strong enough to overcome the frictional forces associated with the annular loops. When the slide is moved away from the wide neck band portion, the overall length of the support increases. When the slide is moved toward the wide neck band portion the overall length of the support decreases.

The clasp is comprised of a body portion, a spring, two jaws, a plunger and two brake members. The spring urges the jaws in what may be referred to as a closed position. In the closed position, the jaws extend into a cutout at an end of the body portion. When pressure is exerted against the jaws sufficient to overcome the force exerted by the spring, the jaws open and retract into the body portion. Thus, when a support ring of a musical instrument is pushed against the jaws they open and once the ring passes the jaws, they snap closed by the urging of the spring, thereby capturing the support ring. When it is necessary to remove the instrument from the clasp, the support ring is pushed against the plunger which exerts a force on the spring thereby opening the jaws. At this time, digitally operated brake members on the sides of the body portion are pressed inwardly. The brake members hold the plunger in a position which keeps the jaws in their open position. The instrument support ring may then be pulled out of the cutout. When the brake members are released, the jaws move back to their closed position.

The main problems with the above-described prior art instrument support are that the brake members unnecessarily complicate the manufacturing process, and the structure of the slide and the manner in which the annular loop portions are engaged by the slide cause an undue wearing of the cord.

SUMMARY OF THE INVENTION

A musical instrument support, having an improved slide for adjusting the length of the support and an improved clasp for engaging a musical instrument to be supported is disclosed. The slide is approximately circular in shape and is constructed in a manner to reduce the wearing of a cord which passes through the slide. This is accomplished by utilizing a sleeve which has a lower coefficient of friction than the material from which the slide is made. The cord forms two annular loops around the sleeve. The friction between the annular loops and the sleeve is sufficient to maintain the support at a given length. The clasp is constructed in a manner which reduces the number of moving parts needed to engage and disengage the musical instrument over the prior art thereby simplifying the manufacturing process. In particular, means are provided for disengaging the musical instrument from the clasp, which means comprises only a spring, two retractable jaws and a plunger having an end of predetermined extent which a support ring on the instrument may bear against, thereby compressing the spring and retracting the jaws.

DETAILED DESCRIPTION OF THE INVENTION

Figure 1:
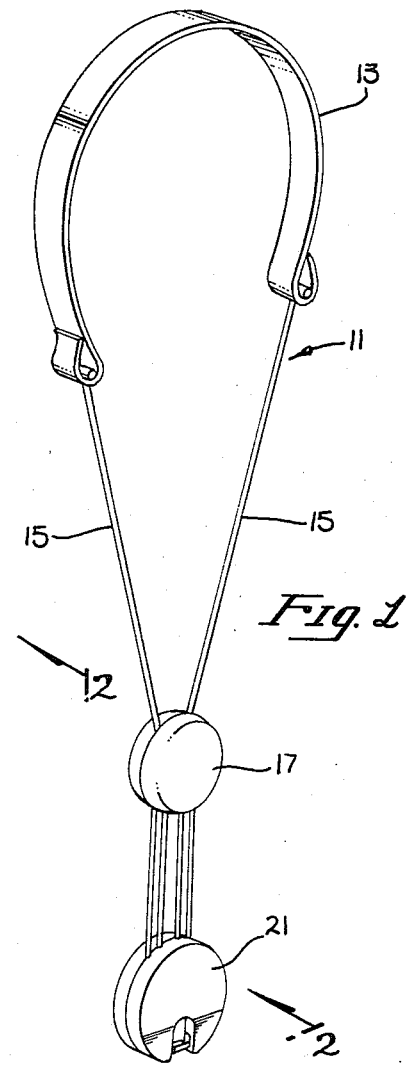
FIG. 1 is a perspective view of the musical instrument support.

Referring to FIG. 1, musical instrument support 11, having a neck engaging loop 13, a cord 15, a slide 17 and a clasp 21 for engaging and disengaging a musical instrument is disclosed. The cord 15 couples the neck engaging loop 13 with the slide 17 and clasp 21 as more fully described hereinbelow. The cord 15 may be coupled to the ends of the neck engaging loop 13 by any convenient means. The length of the support may be adjusted by moving the slide towards the clasp to lengthen the support, and towards the neck engaging loop to shorten the support. A musical instrument is coupled to the clasp by engaging a support ring on the instrument.

Figure 2:
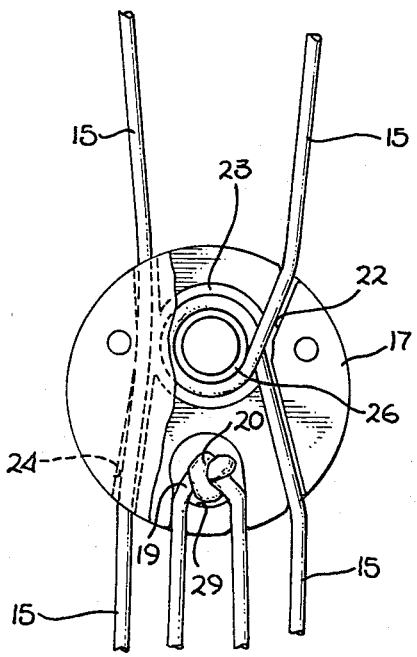
FIG. 2 is a sectional view of the clasp and the slide.

The details of the slide 17 may best be described by referring now to FIG. 2. The slide 17 comprises two substantially round symmetrical body portions. Thus, they may be made from the same mold. The remainder of the description will not distinguish the two body portions since such distinguishment is not necessary to understand the invention. The slide 17 has a first channel 24 for receiving cord 15 from one end of the neck engaging loop 13. A second channel 22 from which cord 15 exits prior to being coupled to the other end of the neck engaging loop 13 will be described more fully below. Adjacent to channel 24 is an annular loop portion 23 around which cord 15 travels in a first direction before continuing through channel 24 and exiting the slide 17 at an end thereof opposite the end cord 15 enters channel 24. A sleeve 26 having the same longitudinal axis as annular loop portion 23 is adapted to fit over the annular loop portion such that the cord 15 is adjacent the outer surface of the sleeve as it travels around the annular loop portion.

Cord 15, after exiting channel 24, forms a first loop 18 as it passes through groove 32 of clasp 21. It then exits groove 32 and returns to the slide 17.

The returning cord 15 enters a cavity 29 in slide 17 disposed intermediate the channels 22 and 24 at an end of slide 17 from which cord 15 exits the channels, on its way to clasp 21. A knot 30 is tied in the cord 15, which knot remains in the cavity 29 during operation of the slide 17. Cord 15 forms a second loop 19 in the cavity 29 and returns to the clasp 21. Cord 15 then enters clasp 21, forms a third loop 20 as it passes through a second groove 34 of clasp 21 and returns to slide 17. The returning cord 15 then is received by channel 24 at the end of slide 17 nearest to clasp 21, and travels around annular loop 23, exiting the slide 17. The cord 15 is then coupled to the other end of neck engaging loop 13.

The slide 17 may be used to adjust the length of the support as follows. When slide 17 is urged towards the clasp 21, the length of the support will increase since the length of cord which is available to form the loops 18, 19 and 20 decreases. When slide 17 is urged towards the neck engaging portion 13, the length of the support decreases because the length of cord 15 forming the loops 18, 19 and 20 increases. The friction which is present between the two annular loops in cord 15 and annular loop portion 23 is sufficient to hold the slide in place while the musician is holding the musical instrument. However, wear on the cord 15 resulting from the friction between the cord and the annular loop portion 23 is reduced by sleeve 26 which has a lower coefficient of friction than the material which comprises the body of the slide 17.

Figure 3:
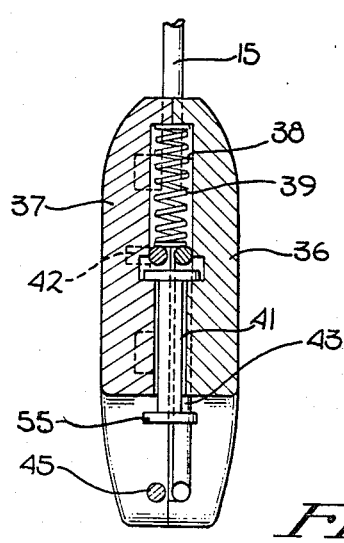
FIG. 3 is a sectional view taken along line 3—3 of FIG. 2.

Referring now to FIGS. 2 and 3, the details of the clasp 21 may best be described. The clasp 21 comprises two substantially round, symmetrical body portions 36 and 37, a spring cavity 38 in each body portion, spring 39, plunger 41, jaws 43 and 45 and a jaw cavity 48 in each body portion, in addition to grooves 32 and 34 described hereinabove. The body portions 36 and 37 being symmetrical, may be produced from the same mold.

Spring cavity 38 is disposed intermediate and in proximity to grooves 32 and 34. One end of body portions 36 and 37 opposite from the ends thereof where spring recess 38 is disposed have an approximately U-shaped cutout 50. A groove 52 extends between U-shaped cutout 50 and spring recess 38. Groove 52 and spring recess 38 have a common longitudinal axis. A cylindrical plunger 41 having enlarged flattened surfaces at its ends fits in cooperatively sized groove 52. The enlarged flattened ends of the plunger 41 extend slightly into spring recess 38 and cutout 50 respectively.

The two jaws 43 and 45 are each formed from stiff wire, each jaw having three 90° bends. A first bend adjacent one end of the wire and a second bend intermediate the ends of the wire lie in one plane. A third bend adjacent the other end of the wire lies in a second place perpendicular to the first plane. An aperture 42 in each of the body portions 36 and 37 is disposed slightly offset from the common longitudinal axis of groove 52 and spring recess 38. Each aperture 42 is sized to receive the end of one of the jaws 43 or 45 adjacent the third bend such that each aperture will act as a pivot point for its respective jaw. A portion of each wire, between the third bend and second bend lie adjacent the enlarged flattened end of plunger 41 which extends into spring recess 38. After the second bend, each wire is directed towards cutout 50. After the first bend, each wire extends into cutout 50 from opposite sides thereof. Jaws 43 and 45 are normally disposed in what will be referred to as the closed position caused by the urging of a spring 39. Spring 39 is disposed within spring recess 38 and bears on those portions of jaws 43 and 48 which lie adjacent the enlarged flattened end of plunger 41 which extends into spring recess 38. When a force is applied to jaws 43 and 45 such that the urging of spring 39 is overcome, the jaws pivot around apertures 42 and the portions of the jaws which extend into cutout 50, then retract into body portions 36 and 37. The recess 48 in each body portion is adapted to receive a respective jaw in its above described retracted position.

Musical instruments which may be supported by the subject musical instrument support incorporate an eyelet or small support ring which fits in cutout 50. In the normal playing position, the eyelet rests against the portions of the jaws which extend into the cutout 50. When it is desired to remove the instrument from the support, the eyelet is pressed against the plunger 41 at its end adjacent the spring 39. This pressure urges the jaws 43 and 45 to enter recess 48. By maintaining pressure on the plunger 41 with the eyelet and rolling the eyelet out of the cutout 50, the support is disengaged from the instrument. To engage the instrument, it is merely necessary to press the eyelet against the portion of the jaws 43 and 45 extending into the cutout 50. This pressure will overcome the force of the spring 39 urging the jaws in the closed position. The jaws will snap open thereby allowing the eyelet of the instrument to enter the cutout 50. After the eyelet passes the jaws, the urging of the spring 38 will cause the jaws to immediately snap close, thereby capturing the eyelet.

It will be appreciated that the end 55 of plunger 41 which extends into cutout 50 must be large enough to enable the eyelet to maintain a force against the plunger while the eyelet is being removed from cutout 50. Thus, the end 55 must be of sufficient extent, i.e. diameter or width in a direction perpendicular to the direction of the portion of the jaws 43 and 45 which extend into the cutout 50, to enable the eyelet to remain in contact with the end of the plunger 41 until the eyelet is removed from cutout 50.

The width or diameter of the end 55 of the plunger 41 is dependent upon the inside and outside diameter of the eyelet. Generally, the larger the outside diameter of the eyelet, the larger the width or diameter of end 55 must be. However, if the inside diameter of the eyelet is sufficiently small, then the eyelet, itself, once it engages the opened jaws, will keep the jaws 43 and 45 open until the eyelet has been removed from the cutout 50.

Thus, an improvement to a prior art musical instrument support which includes a slide for adjusting the length of the support and a clasp for removably coupling an instrument to the support has been described. The improvement comprises means for reducing the wear on the cord due to friction between the cord and the slide, and means for eliminating the need for brake members to hold locking jaws in a retracted position while the instrument is being disengaged.

It is claimed:

1. In a musical instrument support having a neck engaging loop member adapted to be worn around the neck of a human being, a cord coupled to each of two ends of said neck engaging loop member, and a clasp adapted to engage said cord, said clasp disposed at an end of said support opposite said neck engaging loop member, the improvement comprising:

a slide adapted to slidingly and frictionally engage said cord, said slide disposed intermediate the ends of said support;

said slide comprising a substantially round body portion having a first channel disposed within said slide, adapted to receive said cord coupled to one end of said neck engaging loop, a second channel disposed within said slide, adapted to receive said cord coupled to the other end of said neck engaging loop, an annular loop portion disposed intermediate said first channel and said second channel, and adjacent to each of said channels, a substantially cylindrical sleeve adjacent to and encircling an inner surface of said annular loop portion, a cavity disposed intermediate said first channel and said second channel, said cavity adapted to receive said cord and to retain a portion of said cord;

a clasp adapted to engage said cord, said clasp disposed at an end of said support opposite said neck engaging loop member;

said clasp comprising a body portion having a cutout defined on one end thereof, two retractable jaws, each of said jaws normally extending into said cutout from opposite sides thereof, a spring disposed within said body portion adapted to urge said jaws to extend into said cutout, a plunger disposed within said body portion adapted to compress said spring and urge said jaws to a retracted position when a predetermined pressure is applied to said plunger in a direction opposite said cutout, said plunger having an end which extends into said cutout, which end has a predetermined extent;

whereby the length of said support is adjustable by the action of said slide and a musical instrument may be removably coupled to said clasp by the action of said jaws, said predetermined pressure applied to said plunger at said end of predetermined extent which extends into said cutout, and said spring.

2. The musical instrument support defined by claim 1 wherein said sleeve is comprised of aluminum.

3. The musical instrument support defined by claim 1 wherein said portion of said cord received and retained by said cavity comprises a knot in the cord.

* * * * *